(No Model.)
J. L. GOODIN.
COTTON BUNCHER.
No. 270,786. Patented Jan. 16, 1883.
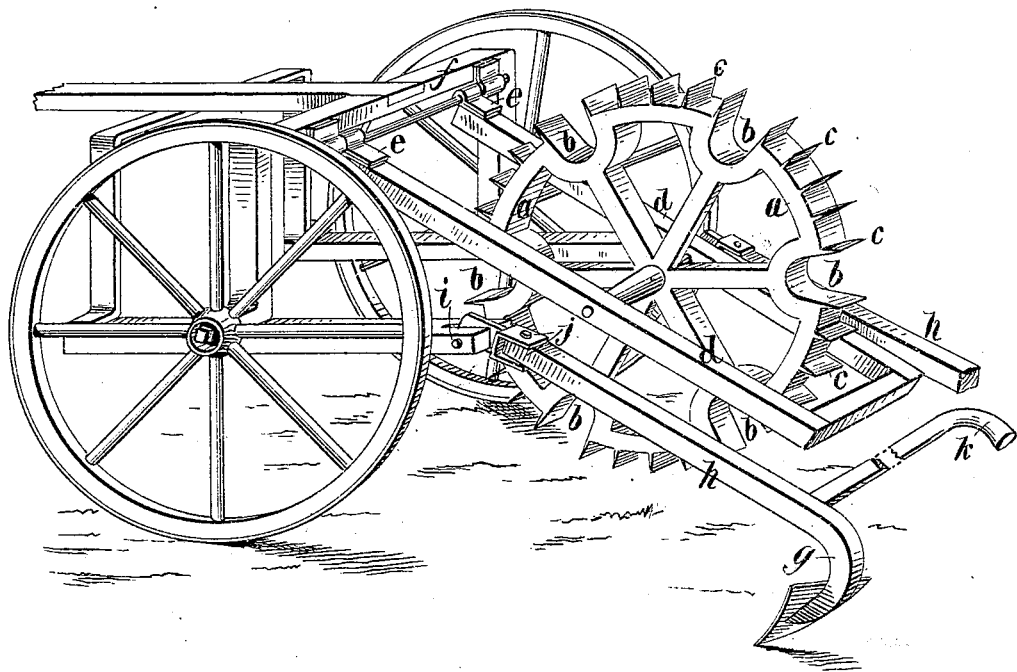
WITNESSES:
J. D. Garfield
C. Sedgwick
INVENTOR:
J. L. Goodin
BY Munn & Co.
ATTORNEYS.

UNITED STATES PATENT OFFICE.

JAMES L. GOODIN, OF MONTGOMERY, TEXAS.

COTTON-BUNCHER.

SPECIFICATION forming part of Letters Patent No. 270,786, dated January 16, 1883.

Application filed September 4, 1882. (No model.)

*To all whom it may concern:*

Be it known that I, JAMES L. GOODIN, of Montgomery, in the county of Montgomery and State of Texas, have invented a new and Improved Cotton-Buncher, of which the following is a full, clear, and exact description.

My invention consists of a wheel to roll along the rows of cotton and crush down the plants, except in certain places, where cavities in the wheel leave the bunches that are to be preserved and cultivated. The wheel is also provided with knives or cutters at intervals along its face, between the cavities, for cutting and otherwise destroying the plants and weeds between the bunches to be retained, and to pulverize the soil. The wheel is to be used alone or in combination with cultivators or plows at its sides, the said wheel and cultivators or plows being hitched to a truck, by which they are to be drawn, all as hereinafter fully described.

Reference is to be had to the accompanying drawing, forming part of this specification, in which is shown a perspective view of my improved cotton-buncher with a plow at each side, the said buncher and plows being hitched to a truck.

I make any suitable wheel with a wide rim, $a$, and sufficiently heavy to crush and destroy the plants and weeds that are pressed under said rim, in which rim I make cavities $b$ at suitable intervals apart to skip and thereby reserve bunches of the plants to be left to grow.

Besides crushing the plants and weeds to be destroyed, I also provide for cutting them and pulverizing the soil by means of cutting-blades $c$, attached to the rim between the cavities.

The wheel thus contrived is to be employed in lieu of the choppers commonly used for thinning out the young plants to facilitate the growth of the remainder. It is in this case mounted in the frame $d$, which is hinged at $e$ to the frame $f$ of a truck, for holding it upright and drawing it along the ground. The rear end of the frame $d$ may have handles by which to lift the wheel when required. Plows $g$ may also be used with it or cultivators of any kind to plow or cultivate the soil at the same time. When these are used the beams $h$ may be connected to the truck by a universal joint, $i j$, or equivalent device, to enable the plows to be shifted more or less distant from the wheel, and so that the beams may be raised by their handles $k$ under the frame $d$ to lift the plows and wheel together, dispensing with the use of handles to the wheel-frame.

It is designed that the wheel-frame $d$ shall be so hinged to the truck-frame that the wheel may be swung upon the truck-frame to be carried about thereon.

It is to be understood that the wheel is to press down the plants and weeds that are to be destroyed, so that the plows, whether used along with the wheel or afterward, will cover them up with fresh earth, and thus assist in destroying them, and at the same time cultivating the plants to be retained and facilitating the subsequent thinning process.

Having thus fully described my invention, I claim as new and desire to secure by Letters Patent—

The wheel $a$, having cavities $b$ in its rim and pulverizing-blades $c$ projecting from its rim, the frame $d$, supporting the same, and the truck-frame $f$, to which said wheel-frame is hinged, in combination with the plows $g$ $h$ $k$ and the horizontal and vertical hinges $j$, connecting said plows with the truck-frame, whereby the wheel and the plows are independently hung to the truck, so that they may adapt themselves automatically to inequalities of the ground, and yet the plows may be guided to cover the crushed plants and avoid the standing ones.

JAMES LOUIS GOODIN.

Witnesses:
W. P. MCCOMB,
THOS. S. GRIFFIN.